United States Patent [19]

Lu

[11] Patent Number: 5,834,026
[45] Date of Patent: Nov. 10, 1998

[54] WATER DISPERSIBLE DIETARY COMPOSITION

[75] Inventor: Meichi Lu, Newark, Del.

[73] Assignee: ABC Health International, Inc., Newark, Del.

[21] Appl. No.: 842,200

[22] Filed: Apr. 23, 1997

Related U.S. Application Data

[60] Provisional application No. 60/017,350 Apr. 26, 1996.
[51] Int. Cl.$^6$ .............................. A61K 9/14; A61K 35/78
[52] U.S. Cl. ........................ 424/498; 424/195.1; 424/490; 514/786; 514/975
[58] Field of Search ................................... 424/439, 442, 424/489, 490, 497, 498, 195.1

[56] References Cited

U.S. PATENT DOCUMENTS 4,551,331  11/1985  Rudin ................................... 424/195.1
5,629,040  5/1997  Takemori et al. ....................... 426/548

*Primary Examiner*—Thurman K. Page
*Assistant Examiner*—James M. Spear

[57] ABSTRACT

This invention teaches unique water dispersible dietary compositions of natural or chemically modified fiber materials that have a surface coating with surface active agents (or surfactants) with HLB number between 4 and 9, preferably between 4 and 7. The dietary product contain at least 10% of fiber materials of essentially polysaccharides derived from sources selected from psyllium, celluloses, methylcelluloses, hydroxyethyl celluloses, hydroxypropyl celluloses, gum guar, vegetables, fruits, or other natural or chemically modified materials. Surprisingly, these fiber containing materials coated with the said surfactants have significant improvement on water dispersibility. The type of surfactants disclosed usually present no harm to human body and can be easily applied to the said fibrous materials in bulk without any solvent.

2 Claims, No Drawings

WATER DISPERSIBLE DIETARY COMPOSITION

This application claims the benefit of U.S. Provisional Application No. 60/017,350 filed Apr. 26, 1996.

FIELD OF THE INVENTION

This invention relates to unique water dispersible dietary compositions containing fibers derived from psyllium, or other grains, vegetables, or fruits or other sources of polysaccharides.

BACKGROUND OF THE INVENTION

Dietary fiber containing products are typically derived from natural sources such as husk of grains, psyllium, celluloses, methylcelluloses, gum guar, amylopectin-rich starch, or other natural or chemically modified polysaccharides materials. They can be used as a bulk forming laxative. However, some of these materials can not be readily dispersed in water, which is quite inconvenient when taking such products. Powell et al teaches in U.S. Pat. No. 4,321,263 issued in Mar. 23, 1982 that psyllium powder can be coated with an alcohol solution of at least one of polyethylene glycol and polyvinylpyrrolidone to improve its water wettability. Furst et al teaches in U.S. Pat. No. 4,828,842 issued in May 9, 1989 that psyllium powder or other fibrous vegetable materials can be coated with a blend of a major amount of hydroxypropyl methylcellulose and a minor amount of polyethylene glycol to improve their water wettability. The drawback of these inventions is that first polyethylene glycol still have some toxicity concern for human body and second both processes require the use of an organic solvent such as isopropyl alcohol, a flamable solvent, which increases the cost and danger of such processing.

SUMMARY OF THE INVENTION

This invention teaches unique water dispersible dietary compositions of natural or chemically modified fiber materials derived from polysaccharides that are coated with surface active agents (or surfactants) with HLB number between 4 and 9 preferably between 4 and 7. The dietary product contains at least 10% of fiber containing materials that are polysaccharides derived from sources selected from husk of grains, especially psyllium, celluloses, methylcelluloses, hydroxyethyl celluloses, hydroxypropyl celluloses, gum guar, vegetables fiber, fruits fiber, and amylopectin-rich starch. Surprisingly, these fiber containing materials coated with the said surfactants have significant improvement on water wettability and dispersibility. These surfactants usually present no harm to human body and can be easily applied to the said fibrous materials in bulk without any solvent. It certainly improves safety and cost of production processes.

DETAILED DESCRIPTION OF THE INVENTION

This invention relates to improve water dispersibility of fiber containing dietary products. These products are typically used as bulk forming laxative. These fiber containing products are derived from natural sources of polysaccharides such as husk of grains especially psyllium, celluloses, methylcelluloses, gum guar, vegetables fiber, fruits fiber, and amylopectin-rich starch. They can also be chemically modified fiber materials of polysaccharides such as etherification, esterification, hydroxyethoxylation, or hydroxypropoxylation of the above mentioned natural resources of polysaccharides. Examples are hydroxyethyl cellulose, hydroxypropyl cellulose, hydroxypropyl amylopectin and the like. Polysaccharides are carbohydrates with general repeat units of $(C_6H_{12}O_6)$. Polysaccharides can also be defined as polyhydroxy aldehydes and ketones or substances that hydrolyze to yield such compounds. These fiber containing products usually do not disperse adequately in water at room temperature.

Surface active agents are called surfactants. They are molecules containing both hydrophobic (water hating) and hydrophilic (water loving) characters. A surfactant structure typically contains at least a hydrophobic hydrocarbon chain such as an alkyl group of carbon number 3 to 30, and at least a hydrophilic group such as a sulfonic acid or a carboxylic acid, or an ethoxylated group. When the hydrophilic group is anionic charged, the surfactant is normally called an anionic surfactant. If the hydrophilic group is an ethoxylated group, the surfactant is usually called a non-ionic surfactant.

The HLB number was first developed by Griffin in 1949 to describe the hydrophobic and hydrophilic characters of surfactants. The HLB number has been proved very successful with alkoxylated non-ionic surfactants. Griffin proposed to calculate the HLB number from its chemical structure, i.e. HLB=% of the hydrophilic group (molar) divided by 5. Thus the maximum HLB number was 20 and represented a completely water soluble surfactant. A HLB of zero represented a completely water insoluble material. An approximate HLB number can be obtained by adding a small quantity of a surfactant (say 0.1–10%) to water and shaking at room temperature. They are typically characterized as follows:

| HLB number | Appearance on adding surfactant to water |
| --- | --- |
| 1–4 | Insoluble |
| 4–7 | Poor dispersion unstable |
| 7–9 | Stable opaque dispersion |
| 10–13 | Hazy solution |
| 13–20 | Clear solution |

In general, materials that are not readily wet by water can be coated with surfactants of high HLB number (greater than 10) to make them more water wettable and dispersable. In contrary, this invention teaches unexpected results, wherein the dietary fibrous products that are not readily dispersible in water can have improved water wettability and dispersibility by partially or fully coating with surfactants of low HLB number (between 4 and 9, preferably between 4 and 7). In addition, surfactants of HLB in this range generally have bacteriostatic effects. It can further help increase the shelf life of the coated products.

The classes of preferred surfactants are generally the ones regulated by U.S. FDA with GRAS or GMP status. GRAS means "Generally recognized as safe": their safety is generally based on extensive toxicological test data or based on use experience for an extended period of time, but their use may be limited. GMP means "Good Manufacturing Practicel": their use not limited as to quantity or application. The most preferred ones comprise lecithin, modified lecithin, mono- and diglycerides, sucrose esters, lactic acid esters of mono- and diglycerides, polyglycerol esters of fatty acid, propylene glycol esters of fatty acid, diacetyl tartaric acid esters of mono- and diglycerides, acetic acid esters of mono- and diglycerides, citric acid esters of mono- and diglycerides, salts of fatty acid.

Another class of surfactants that is also preferred to be used in this invention but with more U.S. FDA regulation comprise ethoxylated monoglyceride, sorbitan monoalkylester, polysorbate, succinylated monoglycerides, sodium or calcium stearoyl lactylate. Their acceptable daily intake is normally regulated to be less than 25 mg/kg of body weight.

The coating weight of the said surfactants on the substrates are usually between 0.1% and 10%, preferably between 0.4% and 5%. Depending upon the cost of the said surfactants and the coating substrates, one may choose to use more or less surfactants to optimize the cost and performance. The following examples are used only to demonstrate the concept.

EXAMPLE 1.

50 grams of psyllium powder (from its husk), 20 to 200 mesh, is placed in a suitable mixer and blended with 0.5 gram of a mono- and diglycerides surfactant mixture containing glyceryl caprylate and glyceryl caprate (CAS Number 26402-22-2 and 26402-26-6) with HLB number between 5.5 and 6.0. They were dry blended for 30 minutes at 60 degree Celsius. The sample was cool to room temperature and ready for water dispersibility test.

EXAMPLE 2.

50 grams of psyllium powder, 20 to 200 mesh, is placed in a suitable mixer with 5 grams of an isopropyl alcohol solution containing 0.25 gram of the same surfactant mixture as described in Example 1. They were blended at room temperature and then dried for 30 minutes at 60 degree Celsius to remove all of the isopropyl alcohol in the sample. The sample was cool to room temperature and ready for water dispersibility test.

EXAMPLE 3.

50 grams of psyllium powder, 20 to 200 mesh, is placed in a suitable mixer with 5 grams of an isopropyl alcohol solution containing 0.25 gram of a surfactant: glyceryl caprylate (CAS Number 26402-22-2) with HLB number between 6.0 and 6.5. They were blended at room temperature and then dried for 30 minutes at 60 degree Celsius to remove all of the isopropyl alcohol in the sample. The sample was cool to room temperature and ready for water dispersibility test.

EXAMPLE 4.

50 grams of psyllium powder, 20 to 200 mesh, is placed in a suitable mixer with 3.5 grams of an isopropyl alcohol solution containing 0.5 gram of a surfactant polysorbate 60 (CAS Number 9005-67-8) with HLB number about 15. They were blended at room temperature and dried for 30 minutes at 60 degree Celsius to remove all of isopropyl alcohol in the sample. The sample was cool to room temperature and ready for water dispersibility test.

EXAMPLE 5.

50 grams of psyllium powder, 20 to 200 mesh, is placed in a suitable mixer with 2.5 grams of an isopropyl alcohol solution containing 0.5 gram of a surfactant sorbitan monooleate (CAS Number 1338-43-8) with HLB number about 4.3. They were blended at room temperature and dried for 30 minutes at 60 degree Celsius to remove all of isopropyl alcohol in the sample. The sample was cool to room temperature and ready for water dispersibility test.

EXAMPLE 6.

50 grams of psyllium powder, 20 to 200 mesh, is placed in a suitable mixer with 2.5 grams of an isopropyl alcohol solution containing 0.5 gram of a surfactant polyoxyethylene(5) sorbitan monooleate (a commercial name is Tween 81) with HLB number about 10. They were blended at room temperature and dried for 30 minutes at 60 degree Celsius to remove all of isopropyl alcohol in the sample. The sample was cool to room temperature and ready for water dispersibility test.

EXAMPLE 7.

50 grams of psyllium powder, 20 to 200 mesh, is placed in a suitable mixer with 2.5 grams of an isopropyl alcohol solution containing 0.5 gram of a surfactant sorbitan monolaurate (CAS Number 1338-39-2) with HLB number about 8.6. They were blended at room temperature and dried for 30 minutes at 60 degree Celsius to remove all of isopropyl alcohol in the sample. The sample was cool to room temperature and ready for water dispersibility test.

EXAMPLE 8.

50 grams of psyllium powder, 20 to 200 mesh, is placed in a suitable mixer with 5 grams of an isopropyl alcohol solution containing 0.25 gram of a surfactant Glyceryl Oleate (CAS Number 25496-72-4) with HLB number between 3 and 4. They were blended at room temperature and dried for 30 minutes at 60 degree Celsius to remove all of isopropyl alcohol in the sample. The sample was cool to room temperature and ready for water dispersibility test.

Water Dispersibility Test:

A half teaspoon of a sample is placed evenly on top of 200 ml of drinking water inside a 250 ml beaker. Start the timer to count the time that it takes to allow the sample to be wetted, dispersed automatically, and sink in water without any agitation.

Water Dispersibility Test Results:

The results of the water dispersibility test was performed on all samples as well as the "control" sample that is the same psyllium powder without any surfactant coating. Each sample was tested twice and the results reported are the average number. The result is listed below:

| Sample No. | Surfactant HLB No. | Time to be completely dispersed |
|---|---|---|
| "control" | uncoated | 7 minutes, 48 seconds |
| Example 8 | 3–4 | 7 minutes, 54 seconds |
| Example 5 | 4.3 | 6 minutes, 03 seconds |
| Example 1 | 5.5–6.0 | 0 minutes, 52 seconds |
| Example 2 | 5.5–6.0 | 0 minutes, 28 seconds |
| Example 3 | 6.0–6.5 | 3 minutes, 21 seconds |
| Example 7 | 8.6 | 6 minutes, 56 seconds |
| Example 6 | 10 | 9 minutes, 15 seconds |
| Example 4 | 15 | 6 minutes, 20 seconds |

It is striking that surfactants with the HLB number between 4.3 and 8.6 offer significant wetting improvement over the uncoated "control" sample. The best HLB number seems to be between 5.5 and 6.5. The results also show that the said surfactant can be applied in bulk to the coated substrates as in Example 1 and achieve similar water wettability results as that with isopropanol solvent in Example 2.

I claim:

1. A dietary product comprising at least 10% of coated fiber materials of essentially polysaccharides, wherein the fiber materials are at least partially or fully coated between 0.1 and 10% by weight of the fiber materials with a surfactant or a surfactant mixture selected from glyceryl caprylate and glyceryl caprate.

2. The dietary products of claim 1 wherein the fiber materials of polysaccharides are selected from husk of grains, husk of psyllium, celluloses, methylcelluloses, hydroxyethyl celluloses, gum guar, vegetables, fruits, amylopectin-rich starch, and their chemically modified polysaccharides materials.

* * * * *